United States Patent
McKee et al.

(10) Patent No.: US 10,946,967 B2
(45) Date of Patent: Mar. 16, 2021

(54) AIRCRAFT SEAT DEPLOYABLE BRIDGE TABLE, MOUNTING PROVISIONS, AND STORAGE PROVISIONS

(71) Applicant: B/E Aerospace, Inc., Winston-Salem, NC (US)

(72) Inventors: Eric M. McKee, Oak Ridge, NC (US); Bradley J. Smith, Pfafftown, NC (US); Rohn A. Bowden, Greensboro, NC (US); Brett A. Hall, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 102 days.

(21) Appl. No.: 16/436,069

(22) Filed: Jun. 10, 2019

(65) Prior Publication Data
US 2020/0385123 A1    Dec. 10, 2020

(51) Int. Cl.
*B64D 11/06*    (2006.01)

(52) U.S. Cl.
CPC ...... *B64D 11/0605* (2014.12); *B64D 11/0646* (2014.12)

(58) Field of Classification Search
None
See application file for complete search history.

(56) References Cited

U.S. PATENT DOCUMENTS

| | | | |
|---|---|---|---|
| 1,134,720 A * | 4/1915 | Bradley | A61G 7/072 |
| | | | 5/622 |
| 2,797,973 A | 7/1957 | Culpepper | |
| 3,893,729 A | 7/1975 | Sherman et al. | |
| 4,113,218 A * | 9/1978 | Linder | A61G 13/10 |
| | | | 248/124.1 |
| 4,576,351 A * | 3/1986 | Brink | A47C 7/546 |
| | | | 248/118 |
| 4,591,206 A * | 5/1986 | Pribble | A47C 7/70 |
| | | | 297/148 |
| 4,668,010 A * | 5/1987 | Fujiwara | B60N 2/79 |
| | | | 297/150 |
| 5,074,617 A * | 12/1991 | Maxwell | A61G 5/125 |
| | | | 297/188.18 |
| 5,207,477 A * | 5/1993 | Maxwell | A61G 5/10 |
| | | | 297/188.18 |
| 5,582,464 A * | 12/1996 | Maymon | A47C 1/027 |
| | | | 297/487 |
| 6,062,640 A | 5/2000 | Stahl | |

(Continued)

*Primary Examiner* — David E Allred
(74) *Attorney, Agent, or Firm* — Suiter Swantz pc llo

(57) ABSTRACT

A seat assembly including a first armrest having a first lateral side and a first mounting panel pivotally attached to the first lateral side, and a second armrest having a second lateral side facing the first armrest, and a second mounting panel pivotally attached to the second lateral side. The mounting panels are pivotable between stowed positions and deployed positions. A bridge table is removably positionable between the first and second armrests and has a first lateral side for mounting upon the first mounting panel and a second lateral side for mounting upon the second mounting panel, each lateral side including a respective engagement feature for releasably engaging one of the mounting panels. When not in use, the bridge table stores within a box attachable below a seat position of the seat assembly.

20 Claims, 13 Drawing Sheets

(56) References Cited

U.S. PATENT DOCUMENTS

| | | | | |
|---|---|---|---|---|
| 6,298,507 B1* | 10/2001 | Clyburn | ............... | A61G 13/12 |
| | | | | 248/445 |
| 6,315,126 B1 | 11/2001 | Cornelissen | | |
| 8,528,978 B2* | 9/2013 | Purpura | ............... | B64D 11/06 |
| | | | | 297/394 |
| 8,820,548 B2 | 9/2014 | Wilson | | |
| 9,610,879 B2* | 4/2017 | Zheng | ............... | B60N 3/102 |
| 10,828,187 B2* | 11/2020 | Wilson | ............... | A61B 6/0421 |
| 2005/0116514 A1* | 6/2005 | Bufkin | ............... | A47C 7/70 |
| | | | | 297/161 |
| 2007/0114755 A1* | 5/2007 | Pasternak | ............... | A61G 5/10 |
| | | | | 280/304.1 |
| 2007/0120398 A1* | 5/2007 | Butler | ............... | A61G 5/1094 |
| | | | | 297/153 |
| 2013/0069344 A1* | 3/2013 | Moliner | ............... | A61G 5/042 |
| | | | | 280/650 |
| 2016/0302579 A1 | 10/2016 | Chang et al. | | |

\* cited by examiner

AIRCRAFT SEAT DEPLOYABLE BRIDGE TABLE, MOUNTING PROVISIONS, AND STORAGE PROVISIONS

BACKGROUND

Vehicle seats such as aircraft passenger seats are commonly equipped with trays that deploy from seat backs for use by occupants in an aft positioned row. While such conventional tables are of great use, as passengers increasingly multi-task while traveling, their expectations for electronic devices and the like to be accommodated while also using a surface to support beverages and foods and such is increasing.

In some circumstances, a seating row may not be entirely filled, in which case, each unoccupied seat represents an unfilled opportunity to provide additional surface area for passenger effects such as electronic devices, beverages, food and the like. For many travelers, non-adjacent seats may be preferred, especially when strangers occupy a seating row. Thus, passengers are often seated adjacent unfilled seats.

In a seating row that does not rely on an immediately forward row for seat back mounted trays, such as in the forwardmost row of seats in a column of rows, the need for useful surface area is additionally pressing.

Accordingly, improvements in support arrangements for passenger use are needed.

SUMMARY OF THE INVENTIVE ASPECTS

To achieve the foregoing and other advantages, the inventive aspects disclosed herein are directed to an airline seating assembly including a first armrest having a first lateral side and a first mounting panel pivotally attached to the first lateral side, the first mounting panel pivotable between a vertical stowed position and a horizontal deployed position, a second armrest having a second lateral side facing the first armrest, and a second mounting panel pivotally attached to the second lateral side, the second mounting panel pivotable between a vertical stowed position and a horizontal deployed position, and a bridge table having a first lateral side for mounting upon the first mounting panel, and a second lateral side for mounting upon the second mounting panel, each lateral side including a respective engagement feature for releasably engaging a respective one of the first and second mounting panels.

In some embodiments, the first and second mounting panels are biased to the horizontal deployed positions by torsion springs or the like, and wherein the first and second armrests include respective latch levers for releasing the first and second mounting panels to pivot outward from the lateral sides of the armrests to the horizontal positions.

In some embodiments, the latch levers are biased to respective latching positions thereby latching the mounting panels in the vertical stowed positions.

In some embodiments, the engagement feature of each lateral side of the bridge table includes a fixed hook and an actuating hook.

In some embodiments, the fixed hook and the actuating hook engage respective opposing ends of the respective mounting panel.

In some embodiments, the bridge table includes a handle operative to move each actuating hook from a locked position to an unlocked position to permit the bridge table to be removed from the mounting panels.

In some embodiments, the handle is operative to move each actuating hook from a locked position to an unlocked position against the force of a spring.

In some embodiments, the bridge table includes at least one indicator indicating the actuating hook in a locked position or an unlocked position.

In some embodiments, a keeper latch automatically maintains the actuating hook in the unlocked condition until a trigger of the keeper latch is pressed by the respective one of the first and second mounting panels, thereby assuring the indicator indicates the locked or unlocked condition correctly.

In some embodiments, the engagement feature of each lateral side of the bridge table includes spaced tabs received in slots of the respective mounting panel when the bridge table is mounted upon the mounting panels.

In some embodiments, each mounting panel includes a contact ledge that stops the mounting panel at the horizontal deployed position when the mounting panel is pivoted from the vertical stowed position to the horizontal deployed position.

In some embodiments, the contact ledge is hidden within the respective armrest.

In some embodiments, each mounting panel is received, in the vertical stowed position, by a respective receiving area defined in the respective lateral side of the respective armrest.

In some embodiments, each mounting panel, in the vertical stowed position, is flush with the respective lateral side of the respective armrest.

In some embodiments, the first and second armrests are pivotable, each including a respective locking lever automatically actuated when the respective mounting panel reaches the horizontal deployed position, thereby locking the respective armrest in a generally horizontal position.

In some embodiments, the first and second armrests each includes a respective tray deployable from a stowed vertical position within the armrest.

In some embodiments, a box for storing the bridge table is adapted to be mounted below a seating position of the airline seating assembly.

In some embodiments, the box includes a hinging door and actuatable levers operative to permit opening of the door.

In some embodiments, the box includes a liner and mounting bracket having a cage portion at least partially surrounding the liner.

In some embodiments, mounting clips extend upward from the mounting bracket in spaced relation corresponding to transverse beam tubes of the seating assembly.

In some embodiments, the mounting panels have ramped contacts areas to facilitate engagement with the bridge table.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

Figure 1:
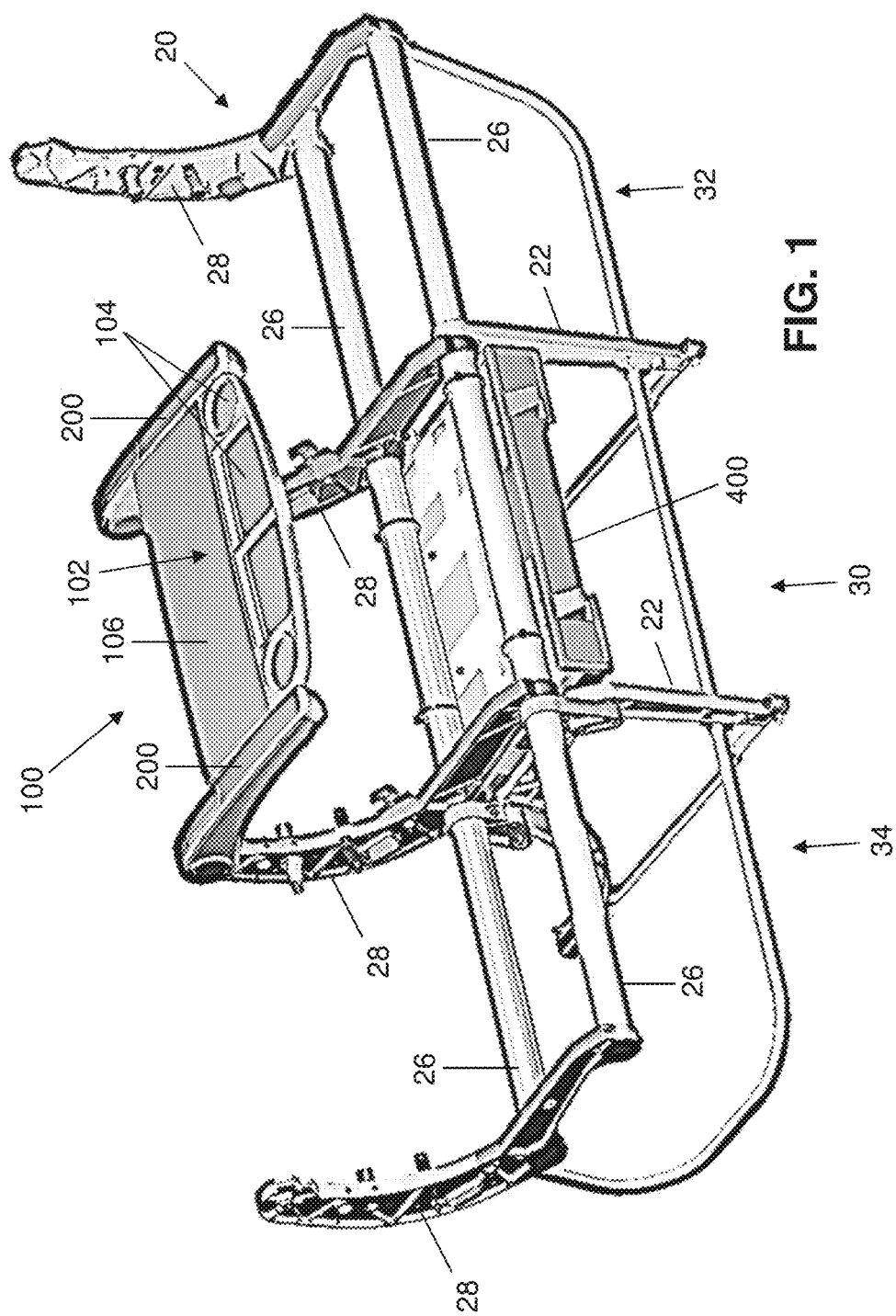
FIG. 1 is a perspective view representing a passenger seating assembly with a bridge table deployed for use according to the present disclosure.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

A bridge table 100 as illustrated in the drawings and described in the following spans the armrests at the lateral sides of a seating position in a seating. The bridge table 100 is advantageously adapted to mount to both the pivoting armrests 200 in a standard seating row as first described in the following with reference to FIGS. 1-8, and the armrests 300 in single-row or forward-most row seating arrangements as subsequently described with reference to FIGS. 9-12. A box 400 for stowing the bridge table is lastly described with reference to FIGS. 13-15.

Referring to FIG. 1, a non-limiting example of a passenger seating assembly is shown generally at reference numeral 20. The seating assembly 20 is generally supported by a number of vertically standing legs 22 interconnected by horizontal transverse beam tubes 26. Spreaders 28 that support pivoting armrests 200 extend upward from the legs 22. In an assembled seating assembly, a passenger seat is mounted between each spaced adjacent pair of spreaders 28. In FIG. 1, two central sets of legs are shown, and two armrests 200 are shown, defining a central position 30 for a passenger seat between the spreaders 28 and over the beam tubes 26. Two positions adjacent the central position, particularly a left position 32 and a right position 34, termed according to the perspective of a seated occupant, are for seats adjacent the central position 30. The seating assembly 20 is shown just for example to have three seating positions. These descriptions relate as well to rows having any number of seating positions. Thus, the bridge table 100 can be mounted on the armrests of any seat in a two seat arrangement, a three seat arrangement, a four seat arrangement, or even on a single seat.

The bridge table 100 mounted on the armrests 200 in FIG. 1 is deployed for use by occupants of seats that would be arranged in the left position and right position in a fully assembled seating group. The bridge table 100 can be stowed in the storage box 400 mounted to and below the beam tubes 26. The bridge table 100 in FIG. 1 is supported at opposing lateral sides by forward disposed and generally horizontal armrests 200 pivotally attached to respective spreaders 28.

As shown in FIG. 1, the upper side 102 of the bridge table 100 has forward receptacles 104, such as cup holders and recesses, for beverages, food items and other small articles such as utensils, phones, writing implements and such. A pad 106 extends across the rearward upper side of the bridge table 100. The pad 106 may be pliable, patterned, and textured to provide contact friction with items placed on the pad such as laptop computers and plates for serving food. For example, the pad 106 can be padded leather bonded to sheet metal. Other materials and constructions are within the scope of these descriptions. Inserts may be included in the bottoms of the forward receptacles 104 and may match the pad, for example in material or color. The pad 106, the inserts, and bridge table 100 overall may be colored and aesthetically prepared to be consistent with a themed appearance in an aircraft cabin as desired.

Figure 2:
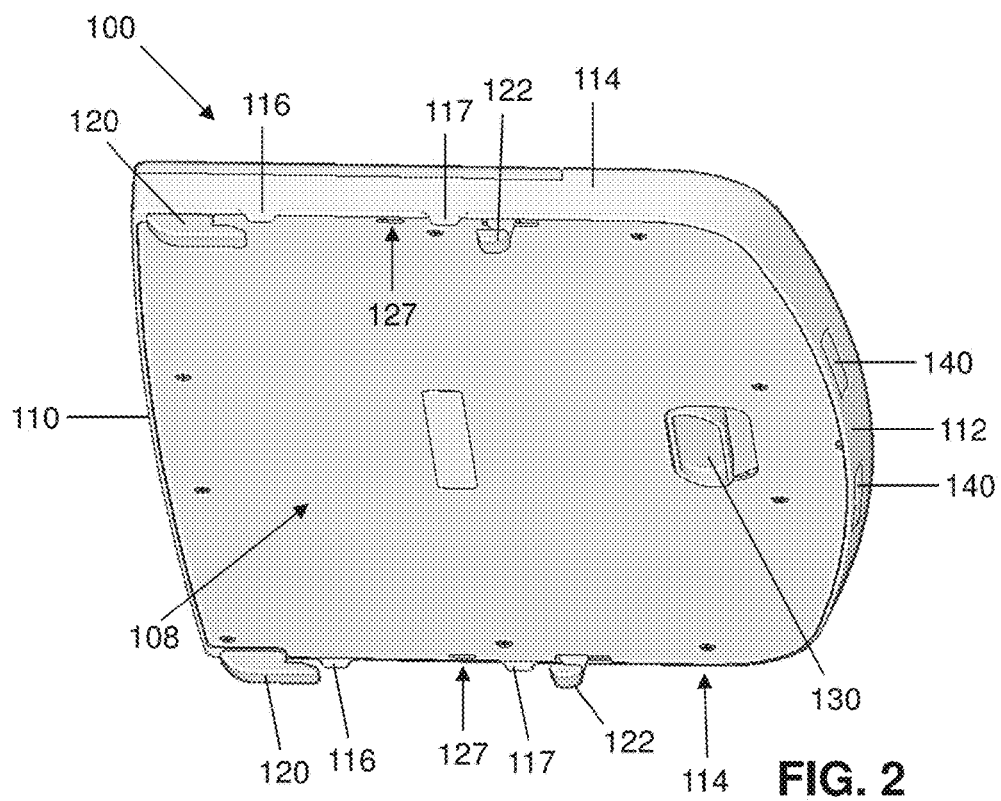
FIG. 2 is a perspective view of the lower side of the bridge table of FIG. 1.

FIG. 2 shows the lower side 108 of the bridge table 100. The rearward end 110 of bridge table 100 generally faces the back rest of a passenger seat when the bridge table 100 is mounted on armrests for use. A forward end 112 of the bridge table 100 opposite the rearward end 110 generally faces forward, for example toward the back of a forward seating row. The lateral sides 114 of the bridge table 100 engage respective armrests when mounted. Each lateral side 114 has multiple engagement features for registering and attaching the bridge table 100 relative to an armrest. In particular, first and second spaced tabs, referenced as a rearward tab 116 and a forward tab 117, extend downward from the lower side 108 of the bridge table 100 along each lateral side 114. A rearward fixed hook 120, which opens forward, is positioned rearward of the rearward tab 116. A forward actuating hook 122, which opens rearward, is positioned forward of the forward tab 117.

Figure 3:
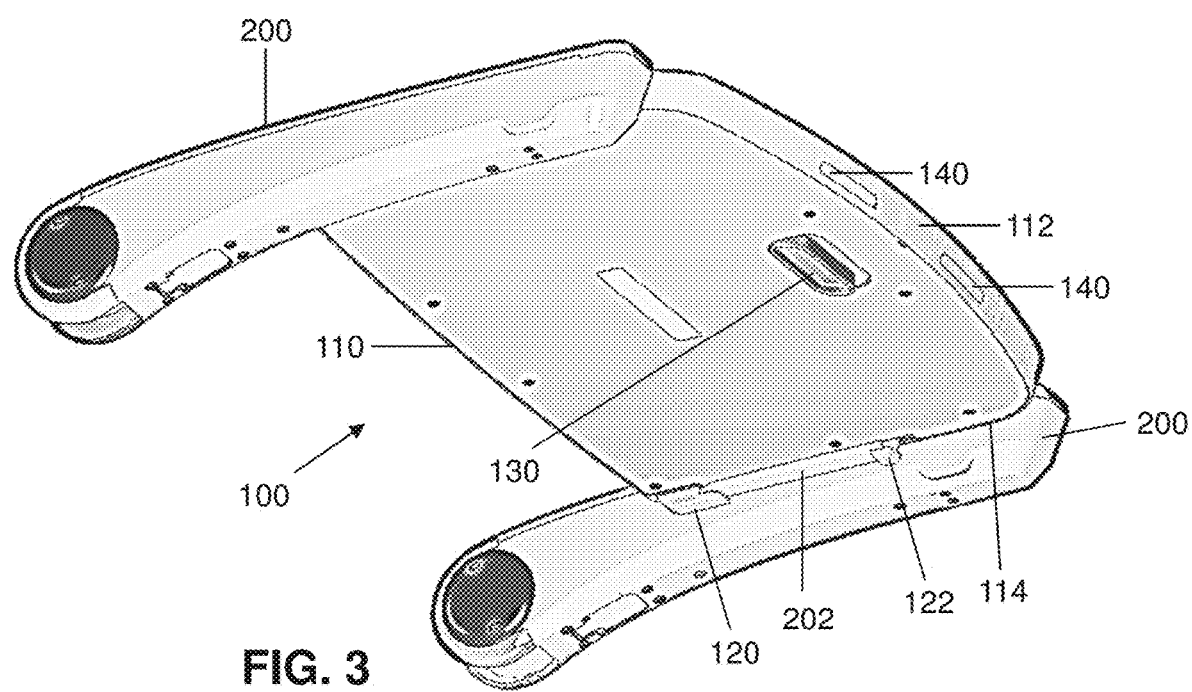
FIG. 3 is a perspective view of the bridge table as mounted in FIG. 1 in a locked condition, showing only the armrests of the seating assembly.

The bridge table 100 is securely mounted on an armrest 200 when, as shown in FIG. 3 particularly for the left-side armrest 200, a mounting panel 202 that deploys from the armrest is engaged by the engagement features at the lateral side 114 of the bridge table 100. In particular, the rearward fixed hook 120 of the bridge table 100 engages the rearward end 204 of the mounting panel 202 (see also FIG. 6). The forward actuating hook 122 of the bridge table 100 engages the forward end 206 of the mounting panel 202. A support side 210 of the deployed mounting panel 202 has a first or rearward slot 216 (FIG. 7) and second or forward slot 217 that align with and receive the rearward tab 116 and forward tab 117 of bridge table 100 respectively.

The forward actuating hook 122 is movable forward and rearward to unlock and lock the bridge table 100 to the mounting panel 202. The actuating hook 122 is shown in the rearward and locked position in FIG. 3, in which the actuating hook 122 engages the forward end 206 of the mounting panel 202 preventing removal of the bridge table 100 from the armrest. The actuating hook 122 is shown in the forward and unlocked position in FIGS. 4A and 4C. When the bridge table 100 is placed on the mounting panels 202 (FIG. 4A) with the actuating hook 122 in the forward and unlocked position, the actuating hook 122 is disengaged from the forward end 206 of the mounting panel 202 permitting removal of the bridge table 100 from the armrest. The forward actuating hooks 122 are biased toward the locked position. An actuatable handle 130 along the lower side 108 of the bridge table 100 is used by hand to move the actuating hooks 122 to their unlocked positions to permit the bridge table 100 to be removed from the armrests.

Figure 4A:
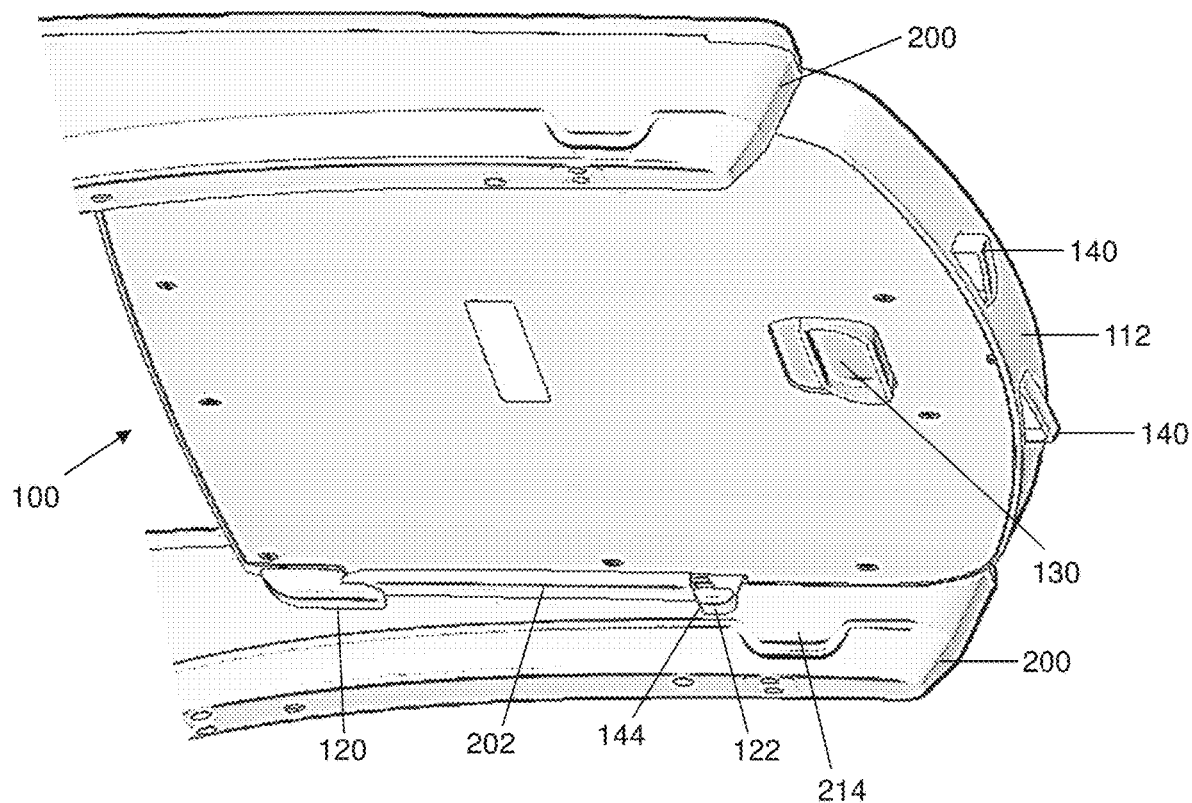
FIG. 4A is a perspective view of the lower side of the bridge table as mounted in FIG. 1 in an unlocked condition, showing only the armrests of the seating assembly.
Figure 4B:
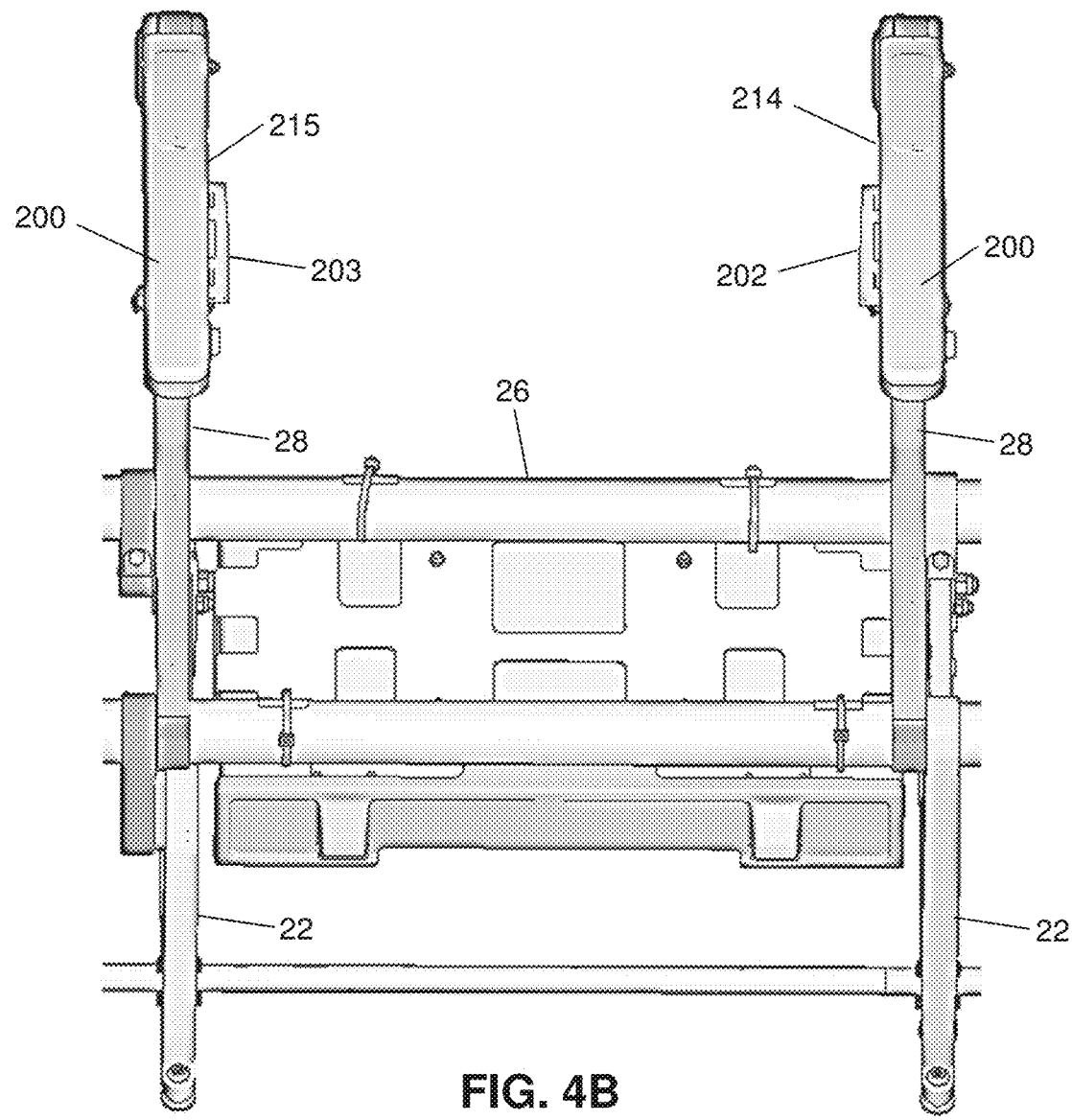
FIG. 4B is a perspective view of the armrests of FIG. 4A without the bridge table for illustration of both mounting panels.

For direct illustration of the two mounting panels on which the bridge table is mounted, FIG. 4B shows a passenger left side first armrest 200 with a first mounting panel 202 in the deployed position, and a passenger right side second armrest 200 with a second mounting panel 203 in the deployed position. FIG. 4B represents an airline seating assembly in which the first armrest 200 has a lateral side 214 to which the first mounting panel 202 is pivotally attached, and the second armrest 200 has a lateral side 215 facing the first armrest. The second mounting panel 203 is pivotally attached to the lateral side 215 of the second armrest 200. The mounting panels 202 and 203, which are shown in horizontal deployed positions, are pivotable to vertical stowed positions in respective receiving areas in the lateral sides of the armrests.

Figure 5A:
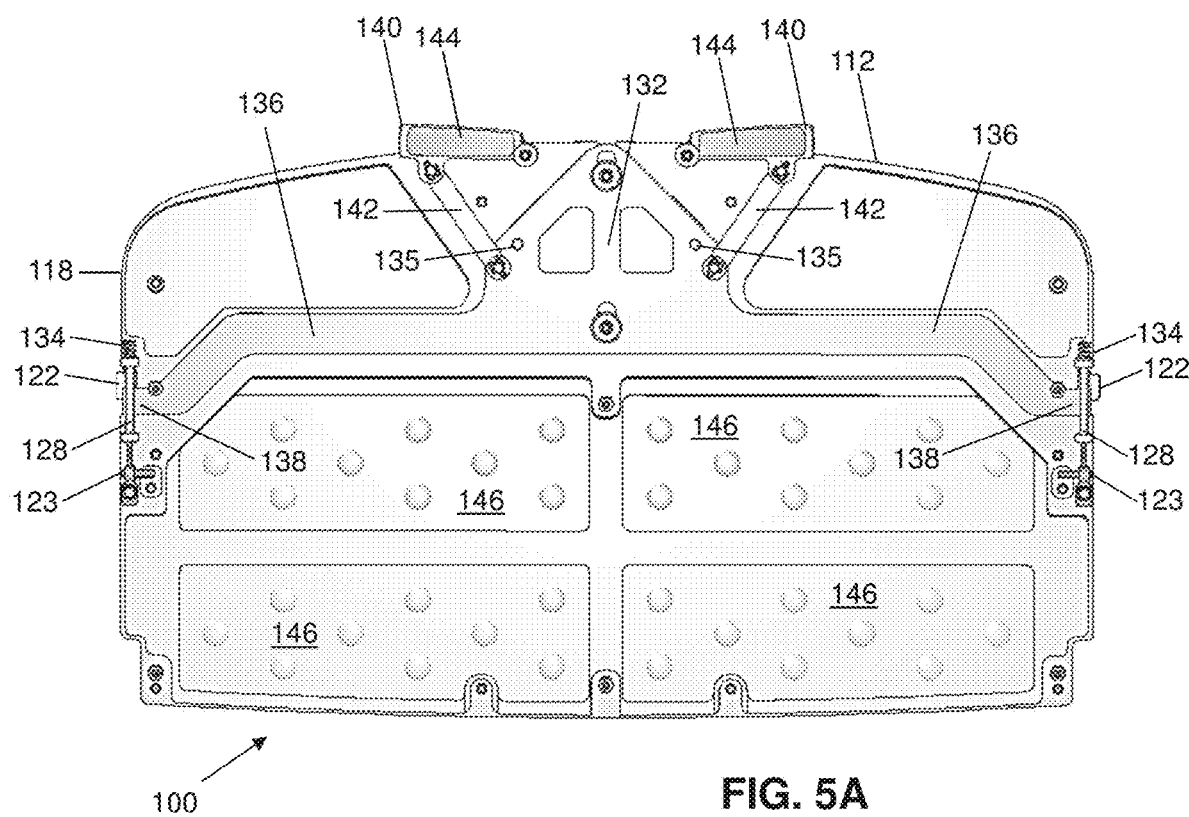
FIG. 5A is a top plan view of internal components of the bridge table of FIG. 1.
Figure 5B:
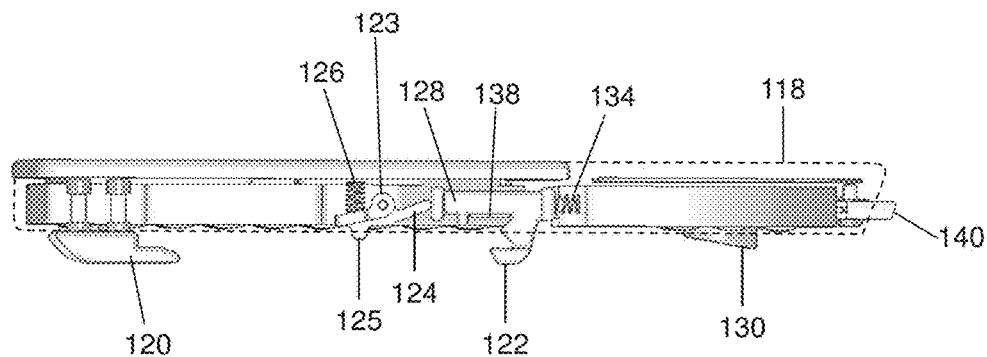
FIG. 5B is a side view of internal components of the bridge table of FIG. 1.

FIG. 5A shows internal components of the bridge table 100 from above. FIG. 5B shows a similar side view, with an exterior wall 118 shown in dashed line for illustration of the interior components. A yoke 132 is movable in a forward direction against the forces of lateral side springs 134. In the assembled bridge table 100, the handle 130 is secured to the yoke 132 using fasteners and holes 135 at the forward central junction area of the yoke. The yoke 132 has symmetrically extending lateral beams 136 having ends 138 that engage the actuating hooks 122. Each actuating hook 122 extends downward from a respective fore-aft movable rail 128 that is biased rearward by a spring 134. The laterally outward end 138 of each beam 136 of the yoke 132 engages a respective actuating hook 122 below the rail 128 such that the yoke 132 and actuating hook 122 travel together in fore aft movements. The springs 134 bias the rails 128, and the actuating hooks 122 therewith, rearward to the locked position, thereby also biasing the handle 130 to a rearward first position (FIG. 3). Forward movement of the handle 130 from the rearward position of FIG. 3 to a second or forward position of FIG. 4A pulls the yoke 132 forward, which pulls the rails 128 and actuating hooks 122 forward against the forces of the springs 134. This pulls the actuating hooks 122 forward to their unlocked positions. Release of the handle 130 permits the actuating hooks 122, yoke 132, and handle 130 to return rearward by the forces applied by the springs 134.

Figure 4C:
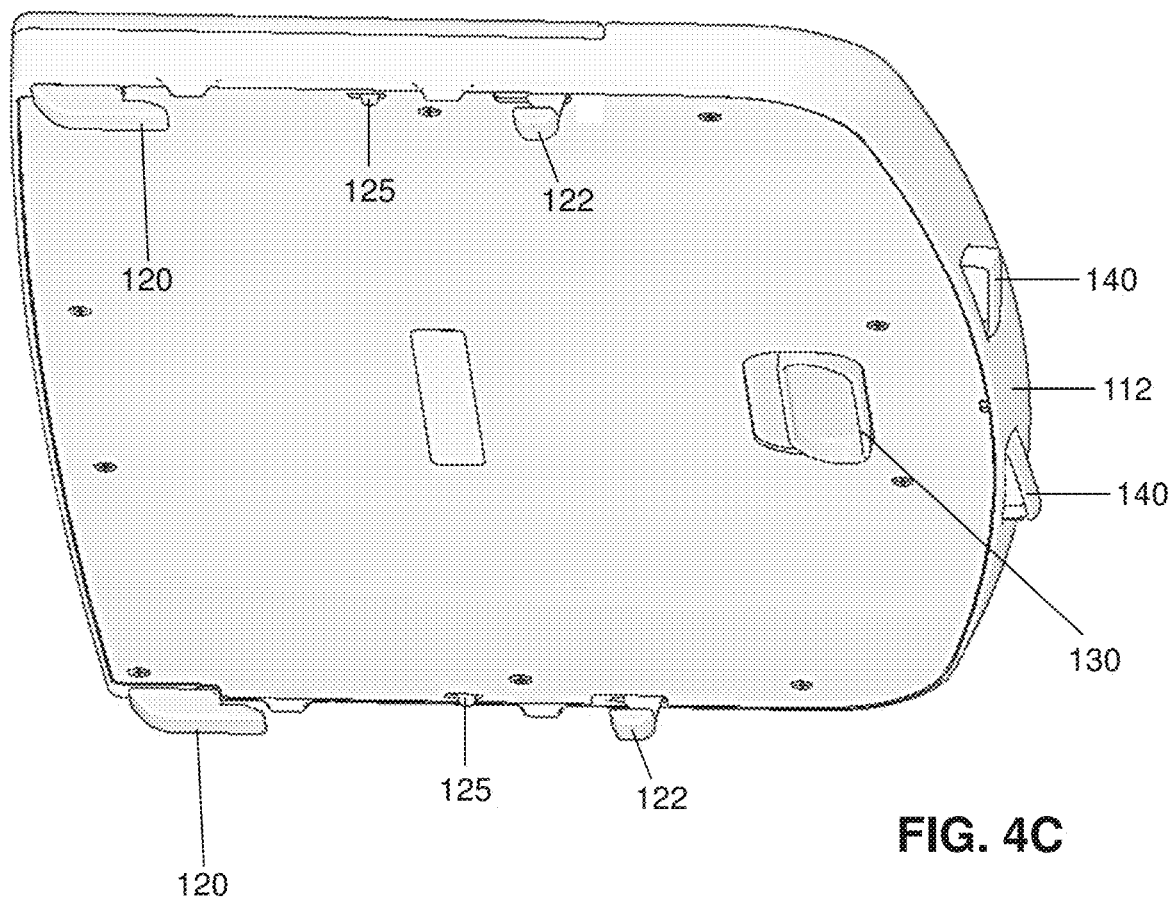
FIG. 4C is perspective view of the bridge table of FIG. 4A without the armrests.

The bridge table 100 includes indicators that show the status, whether in the rearward locked position or the forward unlocked position, of the actuating hooks 122. FIGS. 2 and 3 show forward edges of the indicator bars 140 as flush with the contoured forward end 112 of the bridge table 100, indicating the positions of the actuating hooks 122 as in the rearward locked positions. FIGS. 4A and 4C show the indicator bars 140 as pivoted outward to extended positions from respective receiving areas in the forward end 112 of the bridge table 100, indicating the positions of the actuating hooks 122 as in the forward unlocked positions. Within the bridge table 100 (FIG. 5A), the pivoting indicator bars 140 are coupled to the yoke 132 by respective links 142. As the yoke 132 moves forward by user action grasping the handle 130 for example, the indicator bars 140 are pivoted to their extended positions from the forward end 112 of the bridge table 100. As the yoke 132 is returned rearward by the force of the springs 134, the indicator bars 140 are pivotally returned to their flush withdrawn positions by the links. Accordingly, the indicator bars 140 indicate the position of the yoke 132, and thereby provide visual confirmation of the locked or unlocked status of the actuating hooks 122. In the illustrated example, the indicator bars 140 have indicator surfaces 144 that are hidden within the bridge table 100 when in the withdrawn positions and visible for viewing inspection when in the extended positions. The indicator surfaces 144 may be colored brightly or inconsistently with other colors or themes of the bridge table 100 to enhance their visibility when in the extended positions (FIGS. 4A, 4C).

Once the actuating hooks reach their forward unlocked positions, a keeper latch 123 (FIG. 5A) at each lateral side of the bridge table 100 maintains a respective actuating hook 122 forward until the bridge table 100 is mounted upon mounting panels 202. As shown in FIG. 5B, the keeper latch 123 includes a forward engagement arm 124 and a rearward trigger tab 125. A central part of the keeper latch 123, between the forward engagement arm 124 and rearward trigger tab 125, is pivotally mounted to the bridge table interior. A biasing spring 126 persistently presses the rearward trigger tab 125 downward toward a slot 127 through the lower side 108 of the bridge table. When the actuating hook 122 reaches the forward unlocked position, and bridge table 100 is removed from contact with the mounting panels 202, the keeper latches 123 automatically pivot, as biased by the springs 126. This extends the trigger tabs 125 through the slots as shown in FIG. 4C, and raises the forward engagement arms 124 to engage the rearward ends of the rails 138 of the actuating hooks 122, latching the actuating hooks in the forward position. This also presses the yoke 132 (FIG. 5A) forward and thereby pivots the indicator bars 140 outward to their extended positions (FIGS. 4A, 4C). When the bridge table 100 is placed upon mounting panels 202, the mounting panels press the trigger tabs 125 inward, which automatically pivots the keeper latches 123 to lower the forward engagement arms 124 and disengage the rails 138, permitting the yoke 132, actuating hooks 122, and handle 130 to return rearward by the forces applied by the springs 134. This pivots the indicator bars 140 to their inward positions (FIGS. 2-3). Thus, because the keeper latch 123 automatically maintains the actuating hook 122 in the unlocked condition until the trigger 125 is pressed by a mounting panel 202, the keeper latches 123 provide assurance that the correct status of the bridge table 100 (mounted or dismounted) is indicated by the indicator bars 140.

FIG. 5A also shows a sound deadening pads or layer 146 within the bridge table 100. The pads or layer 146 reduce the otherwise sharp sounds of the moving elements of the bridge table and sound made when being engaged with the mounting panels.

The support side 210 of the deployed mounting panel 202 has ramped contacts areas 208 at the rearward end 204 (FIG. 6) and forward end 206 (FIG. 7) to facilitate engagement as the bridge table 100 approaches from above while being mounted to the armrests. Similarly, the actuating hook 122 has a lower-side ramped contact area 144 (FIG. 4A) at its rearward end to promote sliding movement and engagement. The above-described engagement features at the lateral side 114 of the bridge table 100, and ramped contact areas 208 of the mounting panel 202, permit a wide range of angles for the approach and contact of the bridge table 100 as attachment to the armrest 200 occurs. When the rearward tab 116 and forward tab 117 of the bridge table 100 align with and insert into the rearward slot 216 and forward slot 217 of the mounting panel 202, respectively, the bridge table 100 and mounting panel 202 engage. The rearward end 204 of the mounting panel 202 engages and is captured by the rearward fixed hook 120, and the forward actuating hook 122 can travel rearward to engage and capture the forward end 206 of the mounting panel 202. The forward actuating hook 122 can travel forward automatically, according for example to the above-described ramped contact areas 208, as the bridge table 100 is pressed toward the mounting panels 202 by user action, even without necessitating direct use of the handle 130. The forward actuating hook 122 can automatically return rearward, locking the bridge table 100 to the armrests. The bridge table tabs 116 and 117 engaged with the mounting panel slots 216 and 217 provide side-to-side stability and fore/aft motion. Removal of the bridge table 100 from the armrests can subsequently be effected by user action grasping the handle 130 and pulling it forward.

Figure 6:
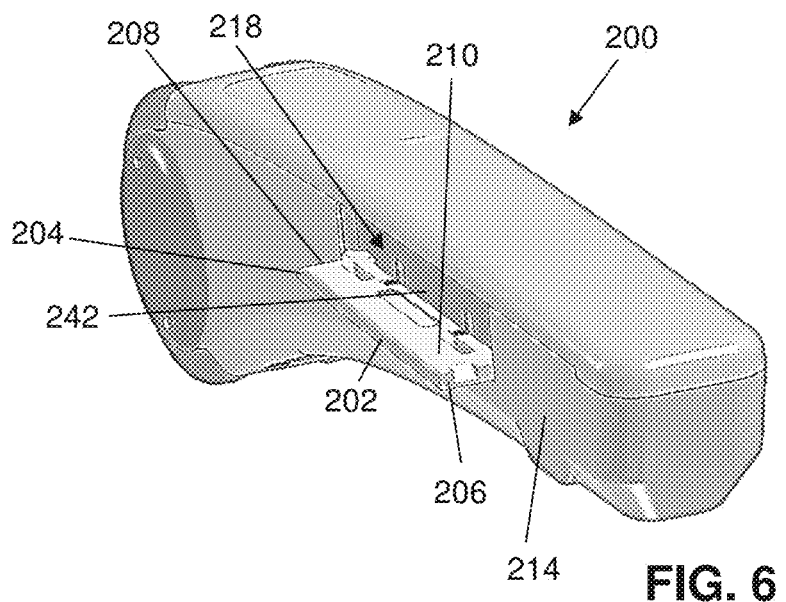
FIG. 6 is a perspective view of an armrest having a mounting panel deployed to support a bridge table.
Figure 7:
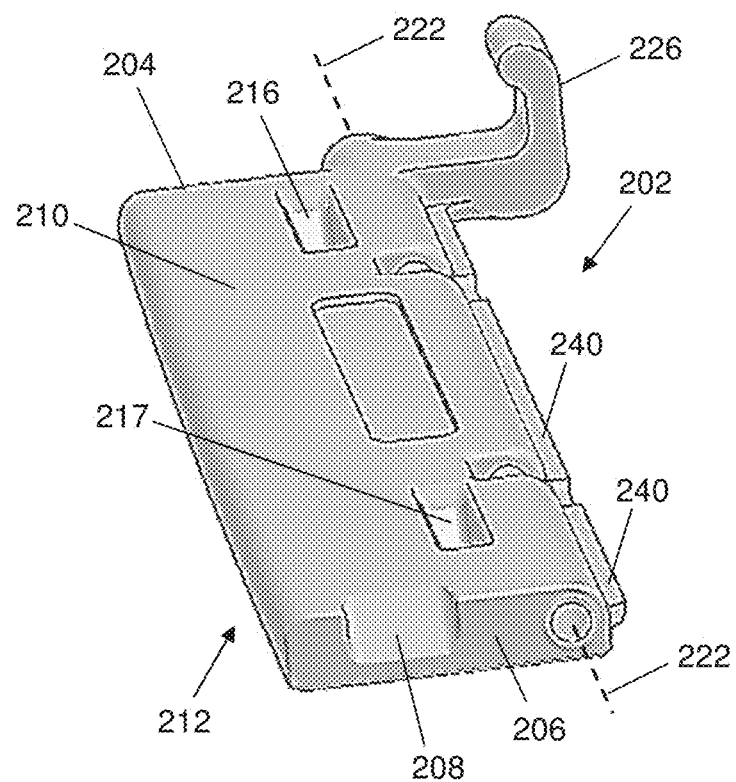
FIG. 7 is a perspective view of the mounting panel of FIG. 6.
Figure 8:
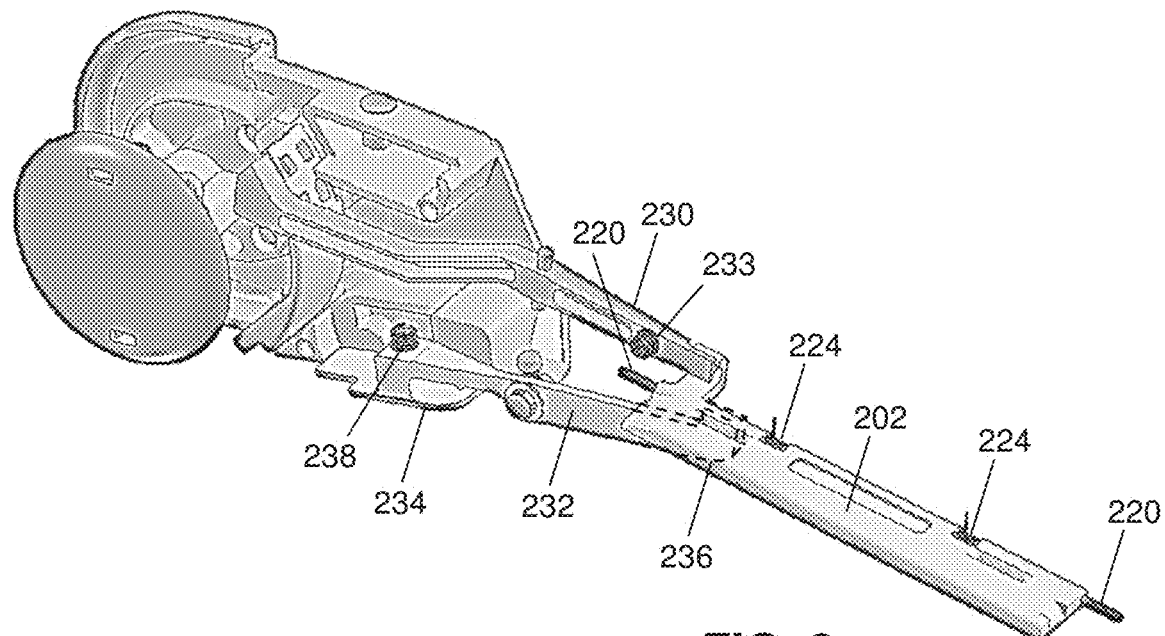
FIG. 8 is a perspective view of internal components of the armrest of FIG. 6.

FIG. 6 shows the mounting panel 202 deployed for use and mounting a bridge table 100. FIG. 7 shows the mounting panel 202 without other armrest structures for illustration purposes. FIG. 8 illustrates actuating internal components of the armrest of FIG. 6, including the deployed mounting panel 202. A left-side mounting panel 202 is particularly shown in FIGS. 6-8. The mounting panel 202 is pivotally attached to, and deploys from, the lateral side 214 of the armrest 200 to engage and support each lateral side 114 of the bridge table 100. The two armrests that support a mounted bridge table 100 are sufficiently symmetric in their mounting features to permit the descriptions and illustrations (FIGS. 6-7) of the attachment of one lateral side 114 of the bridge table 100, in particular the passenger left side, to suffice. The right-side mounting panel 203 (FIG. 4B) is also thereby described by way of mirror symmetry about a plane between the left and right-side armrests.

The mounting panel 202 is pivotally attached to the armrest by a generally horizontal fore-aft extending axle 220 (FIG. 8) that defines a pivot axis 222 (FIG. 7). Torsion springs 224 bias the mounting panel 202 to pivot laterally outward from the armrest 200 to the illustrated deployed position in which the mounting panel 202 is generally horizontal. A first side of the mounting panel 202 referenced as the support side 210 is generally horizontal and facing upward in the deployed position. In a stowed position (not shown), the support side 210 is generally vertical, facing into a receiving area 218 of the armrest where the mounting panel 202 stows. In the stowed position, a second side 212 of the mounting panel 202, opposite the support side 210, faces laterally outward from the armrest 200 generally flush with the lateral side 214 of the armrest.

At the rearward end 204 of the mounting panel 202, a rigid arm 226 (FIG. 7) extends from the mounting panel 202 beyond the pivot axis 222 and actuates a locking lever 230 within the armrest as the mounting panel 202 reaches the deployed position as shown in FIG. 8. The locking lever 230 is pivotally mounted to the armrest 200 and biased toward the arm 226 and to an unlocked position by a spring 228. The locking lever 230 is automatically actuated by the arm 226, thereby locking the armrest 200 in the forward disposed and generally horizontal position and preventing the armrest from pivoting upward, when the mounting panel 202 reaches the deployed position. As the mounting panel 202 is returned to the stowed position, the arm 226 releases the locking lever 230 thereby unlocking the armrest 200 and permitting it to pivot upward by user action if desired.

The rigid arm 226 also latches the mounting panel 202 in the stowed position (not shown) by engaging a pivoting latch lever 232 within the armrest. The latch lever 232 (FIG. 8) has a rearward end 234 defining a user-actuatable button in the lower side of the armrest 200 (FIG. 3). A forward end 236 of the latch lever 232 is marked in dashed lines as hidden by the rearward end 204 of the mounting panel 202 in FIG. 8. Pressing the rearward end 234 of the latch lever upward by user action pivots the forward end 236 downward away from engagement with the arm 226, releasing the mounting panel 202 to pivot outward to the illustrated deployed position by force of the torsion springs 224. To return the mounting panel 202 to the stowed position from the deployed position (FIG. 6), a user presses the mounting panel 202 pivotally into the receiving area 218 until the arm 226 is engaged by the forward end 236 of the latch lever. A biasing spring 238 biases the latch lever 232 into a latching position, in which the forward end 236 is pivotally raised to engage the arm 226, thereby latching the mounting panel 202 in the stowed position. Mutually contacting surfaces of the latch lever 232 and arm 226 can be beveled to facilitate the return of the mounting panel 202 to the stowed position.

A contact ledge 240 (FIG. 7) extends from the mounting panel 202 beyond the pivot axis 222 and engages the lower edge of a plate 242 (FIG. 6) in the armrest 200 when the mounting panel 202 reaches the deployed position. The contact ledge 240 stops rotation of the pivoting mounting panel 202 as the panel deploys and assures the proper horizontal position as the contact ledge 240 contacts the plate 242. The engagement of the contact ledge with the plate prevents the mounting panel 202 from pivoting below horizontal as it deploys from the armrest 200 and firmly maintains the horizontal disposition of the deployed mounting panel 202 to support a bridge table 100. The contact ledge 240 faces vertically in the deployed position and horizontally in the stowed position (not shown). In either position, the contact ledge 240 and the lower edge of the plate 242 are hidden within the armrest 200. By bearing load, the hidden contact ledge 240 relieves the second side 212 of the mounting panel 202 from needing to contact any portion of the armrest. This preserves the condition of the second side 212, which is the aesthetic show surface, by preventing cosmetic damage for example, as might otherwise occur due to contact between painted or otherwise decorative surfaces.

The preceding descriptions refer to an armrest type that pivots forward to a horizontal position for use as shown in FIG. 1. Such pivoting armrests 200 may be useful, for example, in standard passenger row seating in a cabin environment with multiple rows of seating. Accordingly, the described and illustrated armrests and deployable mounting panel 202 are non-limiting examples to which the bridge table 100 can be mounted. The bridge table 100 as described and illustrated can be mounted on other types of armrests. In airline cabin environments, a typical seating row relies upon a forward row for deployable seat back trays. However, the forward most row of seating in a column of rows does not rely upon another row for such a table. Accordingly, the armrests in a forward most row may serve as stowage housings for deployable trays. In such seating assemblies, a fixed armrest may be designed with notable differences from the pivoting armrests of FIG. 1.

Figure 9:
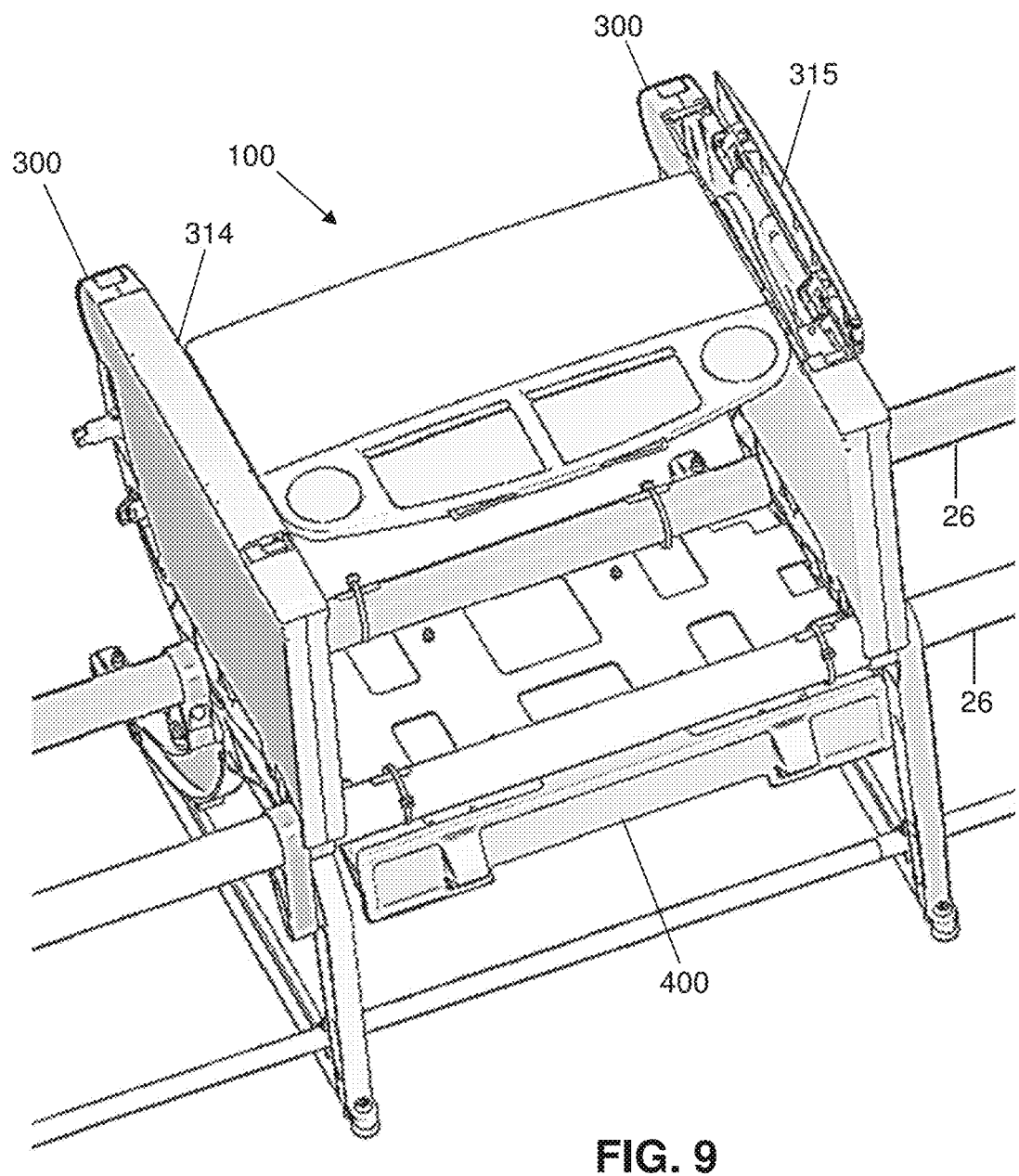
FIG. 9 is a perspective view representing another passenger seating assembly with the bridge table of FIG. 1 deployed for use according to the present disclosure.
Figure 10:
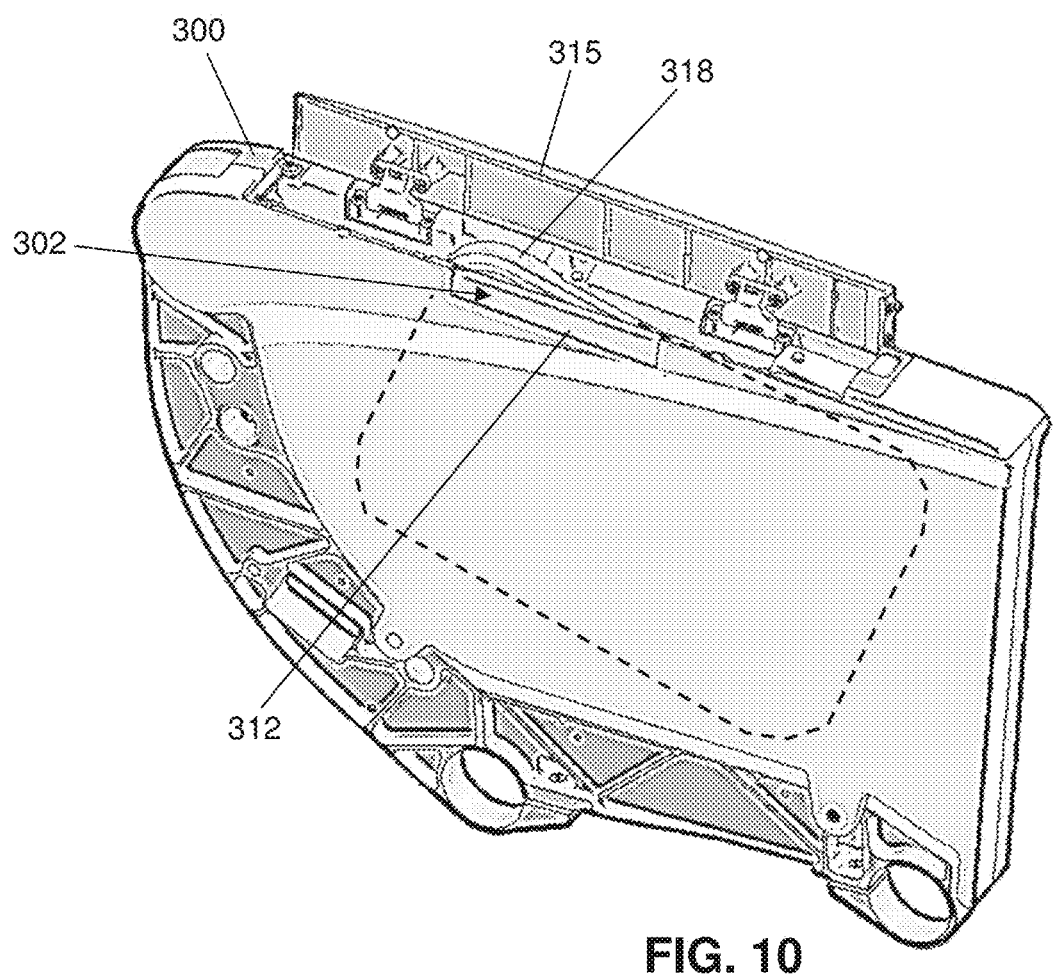
FIG. 10 is a perspective view of the passenger left armrest structure of FIG. 9, shown with a mounting panel thereof in a stowed condition.

For example, referring to FIG. 9, a non-limiting example of a passenger seating assembly having fixed armrests 300 may be advantageous for use in a single-row seating environment or as a forward most row of seating in a column of rows. Only a single seating assembly position is shown, representing any position in a seating row having any number of positions. The armrests 300 in FIG. 9 serve as housings for trays 318 (FIG. 10) that deploy through openings under pivoting covers. The tray 318 in FIG. 10 is shown in its stowed vertical position by dashed line for hidden portions within the armrest. The covers, in their closed positions, serve as arm support surfaces for use by seat occupants. A passenger-right cover 314 is shown in the closed position in FIG. 9, and a passenger-left cover 315 is shown in the open position. The bridge table 100 described above is shown mounted on the fixed armrests 300. The covers are pivotally connected to their respective armrests by hinges. The covers may be biased into and/or releasably latched in their closed positions.

The two armrests 300 that support the mounted bridge table 100 are sufficiently symmetric in their mounting features to permit these descriptions and illustrations of the left side structure to suffice. A mounting panel 302 according to the embodiment illustrated in FIGS. 9-12 is pivotally attached to the armrest 300 by a generally horizontal fore-aft extending axle 320 (FIG. 11) that defines a pivot axis 322 (FIG. 12). Torsion springs bias the mounting panel 302 to pivot laterally outward from the illustrated stowed position flush within a receiving area of the armrest 300. A first side of the mounting panel 302 referenced as the support side 310 (FIG. 12) is generally horizontal and facing upward in the deployed position. In the stowed position (FIGS. 10-11), the support side 310 is generally vertical, facing into the receiving area of the armrest.

Figure 11:
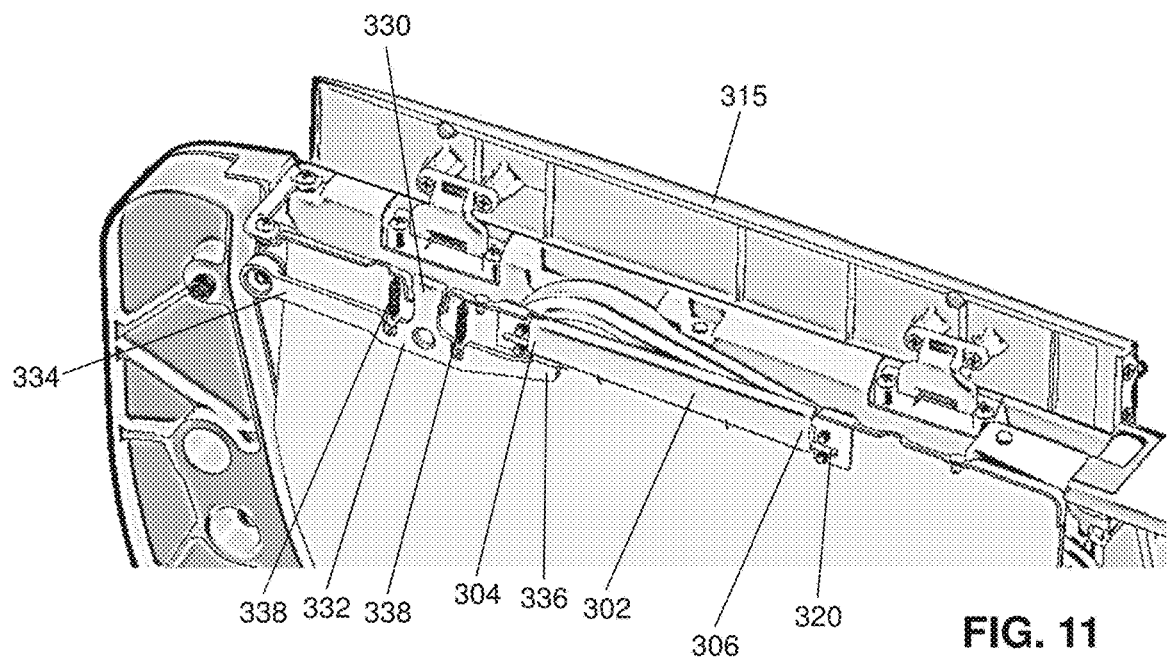
FIG. 11 is a perspective view of internal components of the armrest structure of FIG. 10.
Figure 12:
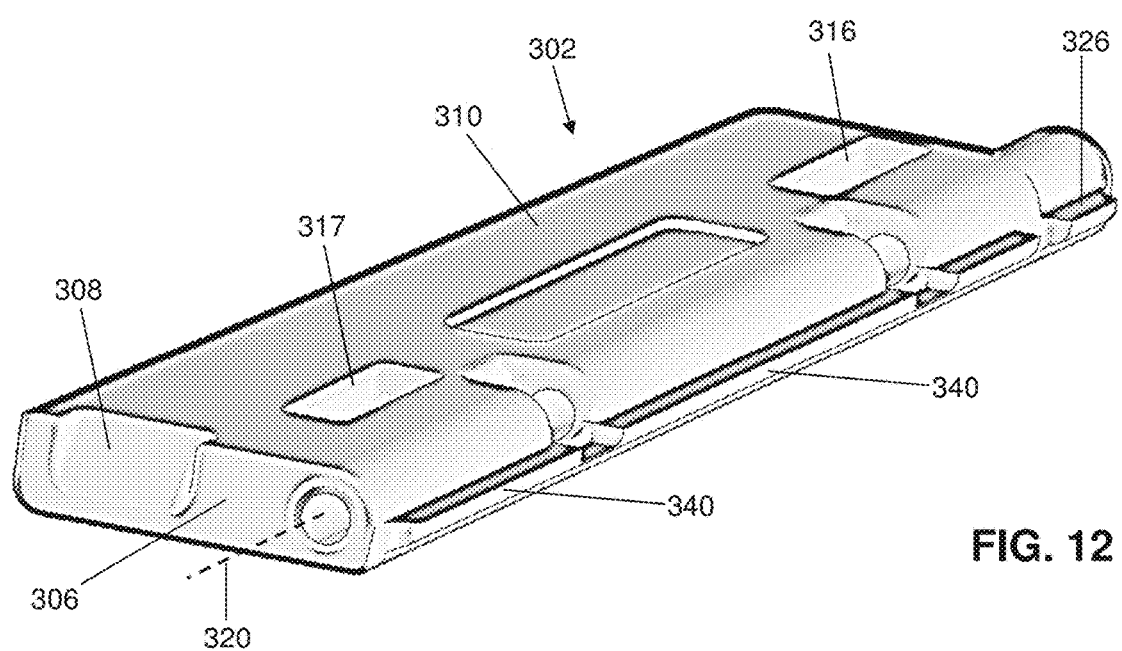
FIG. 12 is a perspective view of the mounting panel of FIGS. 10 and 11.
Figure 13:
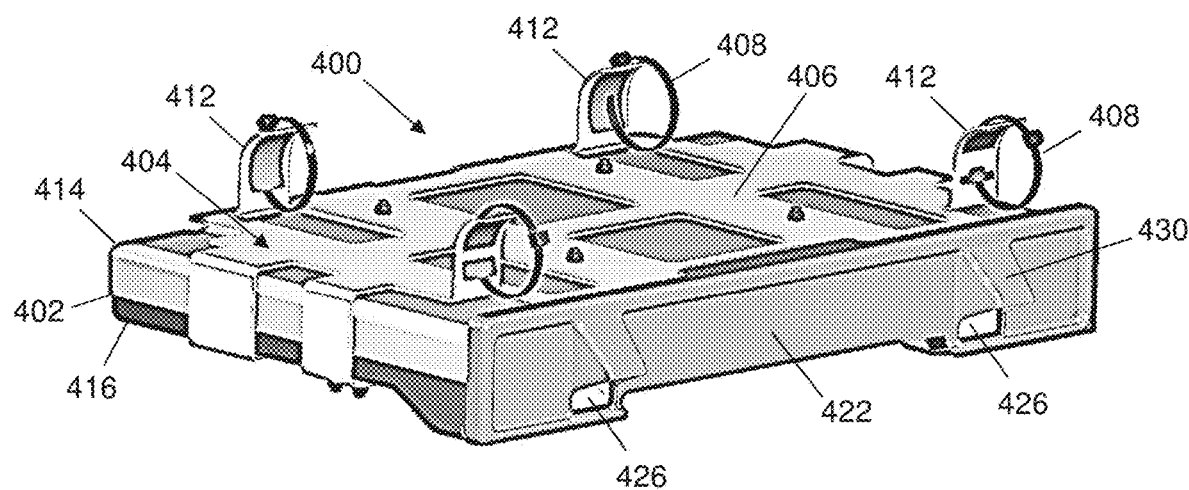
FIG. 13 is a perspective view of a box, according to the present disclosure, for storing a bridge table.

The bridge table 100 attaches to the mounting panel 302 of FIGS. 10-12 in a similar fashion as to the mounting panel 202 of FIGS. 3, 5 and 7. The rearward fixed hook 120 of the bridge table 100 engages the rearward end 304 of the mounting panel 302. The forward actuating hook 122 of the bridge table 100 engages the forward end 306 of the mounting panel 302. The rearward tab 116 and forward tab 117 of bridge table 100 align with and insert into the rearward slot 316 and forward slot 317 in the support side 310 of the mounting panel 302. By use of the handle 130 (FIG. 3) the bridge table 100 can be disengaged from the mounting panel 302 in the same fashion as it is disengaged from the mounting panel 202. Like the first-described mounting panel 202, the mounting panel 302 of FIGS. 10-12 has ramped contact areas 308 at the rearward end 304 and forward end 306 of the support side 310 to facilitate engagement with the bridge table 100. A contact ledge 340 (FIG. 12) extends from the mounting panel 302 beyond the pivot axis and engages the lower edge of a plate in the armrest 300 when the mounting panel 302 reaches the deployed position. The contact ledge 340 stops rotation of the pivoting mounting panel 302 as the panel deploys and assures the proper horizontal position as the contact ledge 340 contacts the plate. The load bearing contact ledge 340 preserves the condition of the second side 312 of the mounting panel 302, which is the aesthetic show surface, in the same fashion as described in the preceding with reference to the mounting panel 302.

At the rearward end 304 of the mounting panel 302, an end segment 326 (FIG. 12) of the contact ledge 340 serves a latching function similar to the rigid arm 226 of the first-described mounting panel 202. The ledge segment 326 latches the mounting panel 302 in the stowed position by engaging a pivoting latch lever 332 within the armrest 300. The latch lever 332 (FIG. 8) has a rearward end 334 pivotally connected to an internal frame point of the arm support 300. A forward end 336 of the latch lever 332 raises as the latch lever pivots upward to a latching position, and, lowers as the latch lever pivots downward to an unlatching position. In the latching position, the forward end 336 engages ledge segment 336. The latch lever 332 is biased into the latching position by linear springs 338.

Intermediate the rearward end and forward end, a member 330 extends upward from the latch lever 332 for use in actuating the latch lever by hand. Pressing the upper end of the member 330 downward by user action pivots the forward end 336 downward away from engagement with the ledge segment 340 of the mounting panel 302, releasing the mounting panel 302 to pivot outward to the deployed position. To return the mounting panel 302 to the stowed position (FIG. 10), a user presses the mounting panel 302 pivotally into the receiving area until the latch lever 332 engages by the mounting panel 202. The upper end of the member 330 is hidden when the cover 314 is in the closed position, and available for user action when the cover is in the open position.

As shown in FIGS. 1 and 9, a box 400 can be provided for stowing the bridge table 100. The box 400 is shown as mounted to the transverse beam tubes 26 beneath the seat assembly. The box 400 (FIG. 13) has an inner liner 402 for housing the bridge table 100, and an outer structure by which the box is mounted to the beam tubes 26. The outer structure is referenced as a mounting bracket 404 by which the box is attached to the transverse beam tubes 26. The mounting bracket 404 has an upper cage portion 406 (FIG. 13) and a lower skeletonized strap 410 (FIG. 14) that together wrap around and support the inner liner 402. Mounting clips 412 extend upward from the mounting bracket 404 in spaced relation corresponding to the beam tubes 26 to align with and engage the tubes. Encircling fasteners 408, shown as tie wraps in the illustrated example, wrap around the tubes 26 and clips 412 thereby securing the mounting bracket 404 to the beam tubes 26.

Figure 14:
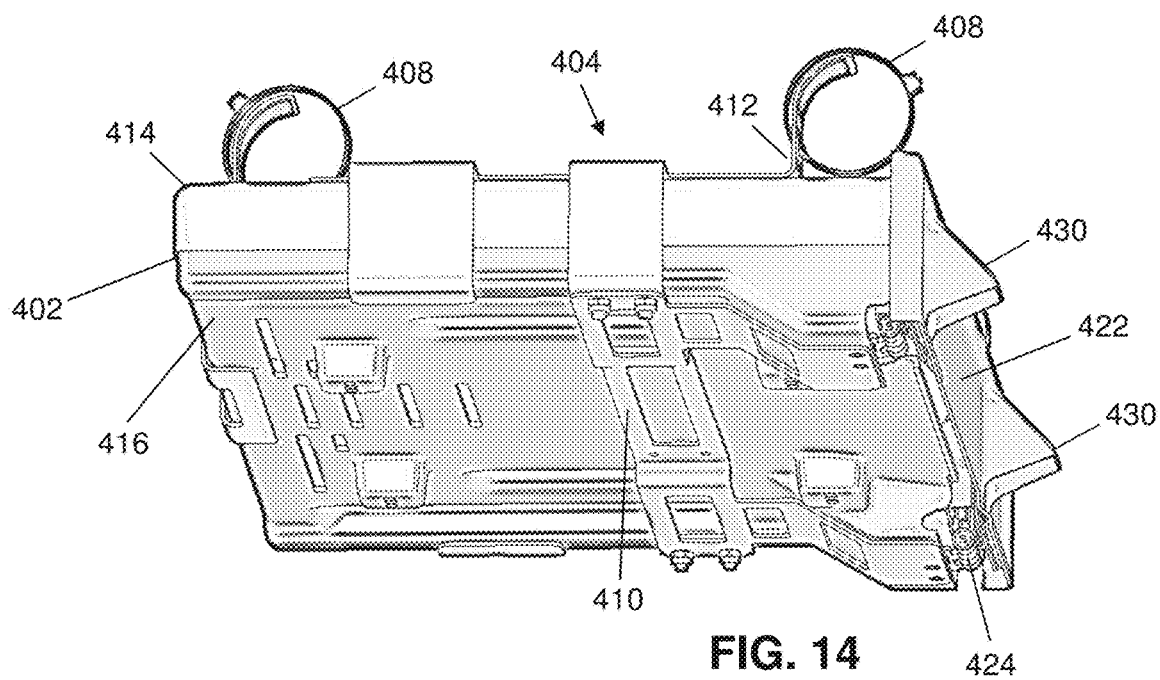
FIG. 14 is another perspective view of the box of FIG. 13.
Figure 15:
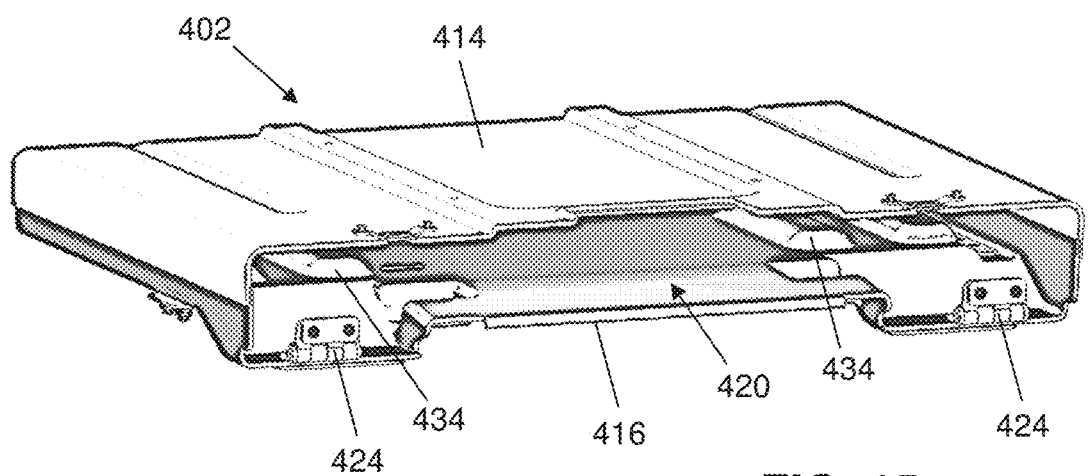
FIG. 15 a perspective view of the box of FIG. 14, shown without its door to illustrate the interior.

The inner liner 402 is shown as having a rigid upper shell 414 (FIG. 15) and a rigid lower shell 416 connected together to define an enclosure interior 420 for receiving the bridge table 100. A door 422 is pivotally attached to the mounting bracket 404 by mounting plates extending forward from the strap 410. Hinges 424 pivotally attach the door 422 the mounting plates at the forward end of the lower shell 416 (FIG. 14). Spaced latches 426 automatically releasably secure the door 422 in the closed position thereof (FIGS. 13-14) when the door is pivoted upward from its open position by user action. The latches 426 are releasable by user action to permit the door to be pivotally opened. A respective hood 430 partially covers each latch, particularly from above, to prevent accidental release of the latches as a seat occupant moves personal items and/or adjusts their seat position.

By mounting the box 400 below the passenger seating assembly, a stowed bridge table 100 is conveniently available close to the point of expected use. Further mounting provisions can be attached to the lower side of the mounting bracket 404 for supporting such articles as life vest containers, pouches, boxes, and other equipment items. Thus, the mounted box 400 does not interfere with expected functions and features of the seat assembly. The mounted box does not significantly alter the strength or stiffness of the seat assembly. The box 400 protects an enclosed bridge table 100 from spills, debris, and damage. The liner 402, within the interior thereof (FIG. 15), provides multi-directional locating features in form of ramps, ribs 434, bumpers, protuberances, or other structures to guide insertion of the bridge table 100 into the enclosure and assure its location in a stowed position. Drainage openings are defined through the lower shell of the liner to permit the escape of any potential liquid intrusion.

The features of the above descriptions and referenced drawings can be combined in whole in part in various ways to provide a bridge table 100 to passenger seating assemblies. The armrests 100 of FIGS. 3 and 9-10 can be installed with new seating assemblies or can replace or retrofit existing armrests. By relying on almost universal seat frame elements such as the spreaders 28 and beam tubes 26 for mounting, the armrests 200 and 300 and storage box 400 can be added to many cabin environment arrangements. The bridge table 100 as illustrated and described in the preceding can be mounted on the armrests 200 of FIG. 3 and/or the armrests 300 of FIGS. 9-10, which can be selectively installed in standard seating assemblies where columns of standard seating rows are arranged and/or in single row or forward most row seating.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A seat assembly, comprising:
   a first armrest having a first lateral side and a first mounting panel pivotally attached to the first lateral side, the first mounting panel pivotable between a vertical stowed position and a horizontal deployed position;
   a second armrest having a second lateral side facing the first armrest, and a second mounting panel pivotally attached to the second lateral side, the second mounting panel pivotable between a vertical stowed position and a horizontal deployed position; and
   a bridge table having a first lateral side configured for mounting upon the first mounting panel, and a second lateral side configured for mounting upon the second mounting panel, each lateral side comprising a respective engagement feature for releasably engaging a respective one of the first and second mounting panels;
   wherein in the horizontal deployed positions, the first and second mounting panels project inwardly toward each other from the first and second lateral sides.

2. The seat assembly of claim 1, wherein the first and second mounting panels are biased to the horizontal deployed positions by torsion springs, and wherein the first and second armrests comprise respective latch levers for releasing the first and second mounting panels to pivot outward from the lateral sides of the armrests to the horizontal deployed positions.

3. The seat assembly of claim 2, wherein the latch levers are biased to respective latching positions thereby latching the first and second mounting panels in the vertical stowed positions.

4. The seat assembly of claim 1, wherein the engagement feature of each lateral side of the bridge table comprises a fixed hook and an actuating hook.

5. The seat assembly of claim 4, wherein the fixed hook and actuating hook engage respective opposing ends of the respective first and second mounting panels.

6. The seat assembly of claim 4, wherein the bridge table comprises a handle operative to move each actuating hook from a locked position to an unlocked position to permit the bridge table to be removed from the first and second mounting panels.

7. The seat assembly of claim 6, wherein the handle is operative to move each actuating hook from a locked position to an unlocked position against the force of a spring.

8. The seat assembly of claim 4, wherein the bridge table comprises at least one indicator indicating a locked or unlocked condition of the actuating hook.

9. The seat assembly of claim 8, the bridge table further comprising a keeper latch that automatically maintains the actuating hook in the unlocked condition until a trigger of the keeper latch is pressed by the respective one of the first and second mounting panels, thereby assuring the indicator indicates the locked or unlocked condition correctly.

10. The seat assembly of claim 1, wherein the engagement feature of each lateral side of the bridge table comprises spaced tabs received in slots of the respective mounting panel when the bridge table is mounted upon the first and second mounting panels.

11. The seat assembly of claim 1, wherein each of the first and second mounting panels comprises a contact ledge that stops the respective mounting panel at the horizontal deployed position when the respective mounting panel is pivoted from the vertical stowed position to the horizontal deployed position.

12. The seat assembly of claim 11, wherein the contact ledge is hidden within the respective armrest.

13. The seat assembly of claim 1, wherein the first and second armrests are pivotable, each comprising a respective locking lever automatically actuated when the respective mounting panel reaches the horizontal deployed position, thereby locking the respective armrest in a generally horizontal position.

14. The seat assembly of claim 1, further comprising a box for storing the bridge table therein, the box attachable below a seating position of the seat assembly.

15. The seat assembly of claim 14, wherein the box comprises at least one of:
   a hinging door and actuatable levers operative to permit opening of the door;
   a liner and mounting bracket having a cage portion at least partially surrounding the liner; and
   fasteners extending upwardly from the box in spaced relation to each other, the spaced relation corresponding to spacing between transverse beam tubes of the seat assembly.

16. A seat assembly, comprising:
   a first armrest having a first lateral side and a first mounting panel pivotally attached to the first lateral side, the first mounting panel pivotable between a stowed position and a deployed position;

a second armrest having a second lateral side facing the first armrest, and a second mounting panel pivotally attached to the second lateral side, the second mounting panel pivotable between a stowed position and a deployed position; and a bridge table removably positionable between the first and second armrests, the bridge table having a first lateral side configured for mounting upon the first mounting panel, and a second lateral side configured for mounting upon the second mounting panel, each of the first and second lateral sides comprising a respective engagement feature for releasably engaging a respective one of the first and second mounting panels, wherein in the deployed positions, the first and second mounting panels project inwardly toward each other from the first and second lateral sides.

17. The seat assembly of claim 16, wherein the first and second mounting panels are biased to the deployed positions, and wherein the first and second armrests comprise respective latch levers for releasing the first and second mounting panels to pivot outward from the lateral sides of the armrests to the deployed positions.

18. The seat assembly of claim 17, wherein the latch levers are biased to respective latching positions thereby latching the first and second mounting panels in the stowed positions.

19. The seat assembly of claim 16, wherein the engagement feature of each lateral side of the bridge table comprises a fixed hook and an actuating hook engaging respective opposing ends of the respective first and second mounting panels, and wherein the bridge table comprises a handle operative against a spring force to move each actuating hook from a locked position to an unlocked position to permit the bridge table to be removed from the first and second mounting panels.

20. The seat assembly of claim 16, further comprising a box for storing the bridge table therein, the box attachable below a seating position of the seat assembly, and the box comprising at least one of a hinging door and actuatable levers operative to permit opening of the door, a liner and mounting bracket having a cage portion at least partially surrounding the liner, and fasteners extending upwardly from the box in spaced relation to each other, the spaced relation corresponding to spacing between transverse beam tubes of the seat assembly.

* * * * *